United States Patent [19]

Hirata

[11] Patent Number: 4,755,986

[45] Date of Patent: Jul. 5, 1988

[54] PACKET SWITCHING SYSTEM
[75] Inventor: Hideyuki Hirata, Tokyo, Japan
[73] Assignee: NEC Corporation, Tokyo, Japan
[21] Appl. No.: 906,282
[22] Filed: Sep. 11, 1986
[30] Foreign Application Priority Data Sep. 13, 1985 [JP] Japan .................................. 60-203816

[51] Int. Cl.$^4$ .................... H04Q 11/04; H04J 3/24
[52] U.S. Cl. ....................................... 370/60; 370/94
[58] Field of Search .................. 370/60, 94, 99, 110.1

[56] References Cited

U.S. PATENT DOCUMENTS

| 4,494,230 | 1/1985 | Turner | 370/60 |
| 4,603,416 | 7/1986 | Servel et al. | 370/94 |
| 4,665,514 | 5/1987 | Ching et al. | 370/60 |

Primary Examiner—Douglas W. Olms
Assistant Examiner—Frank M. Scutch, III
Attorney, Agent, or Firm—Leydig, Voit & Mayer

[57] ABSTRACT

A packet switching system mainly consists of a packet transmission controller, connected to a line group, for performing transmission control of a data packet, and a packet switching unit for receiving the data packet from the packet transmission controller to perform switching processing. The packet switching unit includes a packet separator for separating the data packet into a header part and a data part, a packet header processor for updating the separated header part, a packet data buffer for storing the separated data part, and a packet combiner for combining the output from the packet data buffer and the output from the packet header processor and supplying a combined packet to the packet transmission controller.

6 Claims, 4 Drawing Sheets

PACKET SWITCHING SYSTEM

BACKGROUND OF THE INVENTION

The present invention relates to a packet switching system.

In a packet switching system having a packet transmission controller, connected to a line group, for controlling packet transmission, and a packet switching unit for switching a data packet input through the packet transmission controller, the conventional packet switching unit comprises a general-purpose processor. The packet switching unit stores a received data packet in a common packet storage area in a main memory under the control of the processor, and performs switching and flow control. Input and output ports for the packet transmission controller are connected to a system bus together with the main memory and a direct memory access channel. Such a packet switching system is disclosed in U.S. Pat. No. 4,494,230 (Jan. 15, 1985). The data packet consists of a header part and a data part. In particular, during switching and flow control of the data packet, the header part must be directly processed by the processor. In the conventional packet switching unit, the main memory of the processor also serves as a packet path and a switch. For this reason, although the length of the header part to be processed by the processor is sufficiently shorter than the total length of the data packet, all the received packet data must be stored in the main memory. Therefore, it is difficult to obtain a storage area enough to achieve large-capacity, high-speed packet switching.

SUMMARY OF THE INVENTION

It is an object of the present invention to provide a packet switching system free from the above drawbacks and capable of large-capacity, high-speed packet processing by a simple arrangement without being influenced by the length of a data part.

According to the present invention, there is provided a packet switching system including packet transmission control means, connected to a line group, for performing transmission control of a data packet, and packet switching means for receiving the data packet from the packet transmission control means to perform switching, wherein the packet switching means comprises: packet separating means for separating the data packet into a header part and a data part; packet header processing means for updating the separated header part; packet data buffer means for storing the separated data part; and packet combining means for combining the output from the packet data buffer means and the output from the packet header processing means and supplying a combined packet to the packet transmission control means.

DETAILED DESCRIPTION OF THE PREFERRED EMBODIMENT

A packet switching system according to an embodiment of the present invention will now be described with reference to the accompanying drawings.

Figure 1:
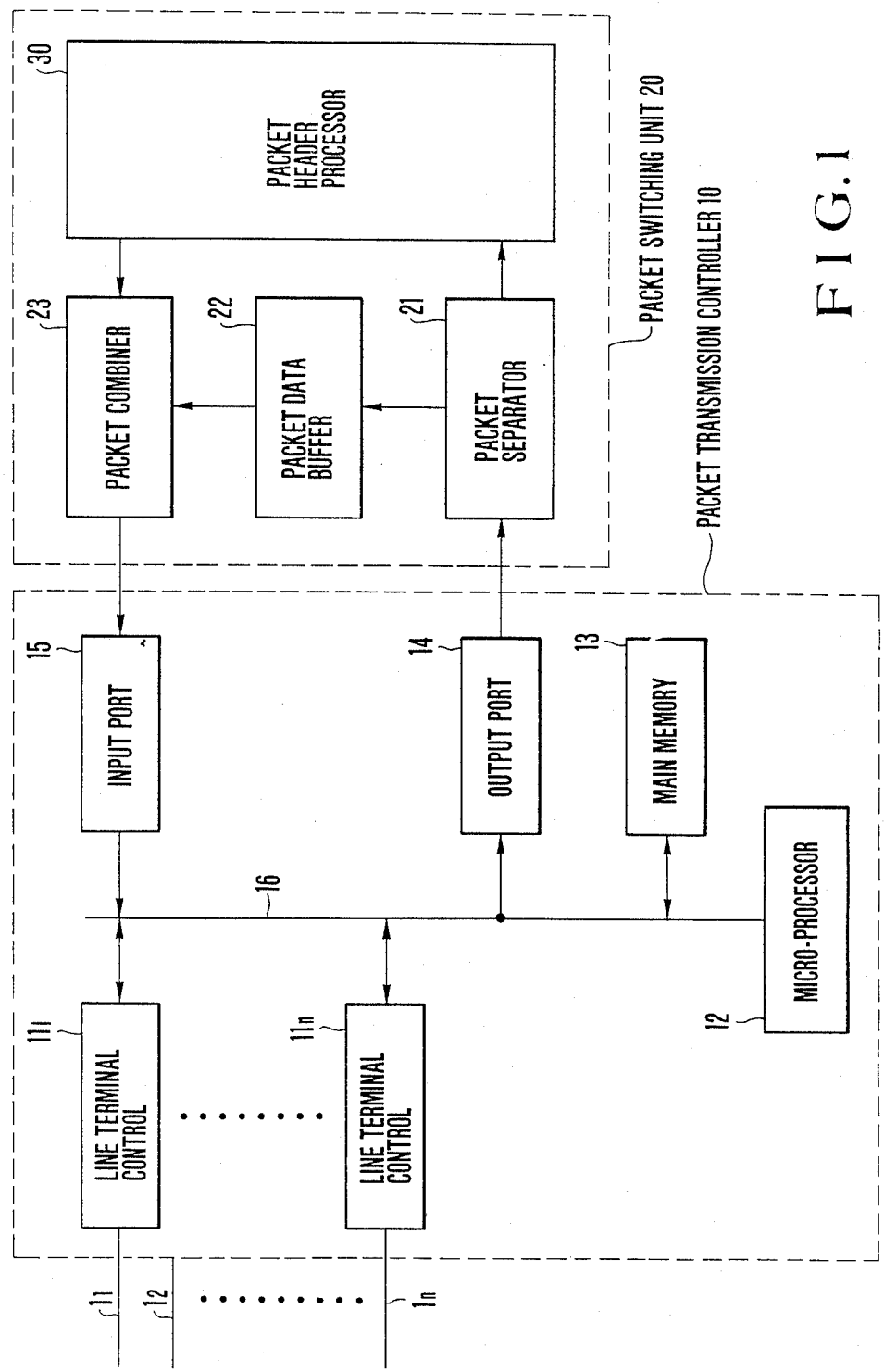
FIG. 1 is a block diagram showing the entire arrangement of a packet switching system according to an embodiment of the present invention.

FIG. 1 is a block diagram showing the entire arrangement of the packet switching system according to an embodiment of the present invention. Referring to FIG. 1, the packet switching system consists mainly of a packet transmission controller 10 and a packet switching unit 20. The packet transmission controller 10 has line terminal controls $11_1$ to $11_n$ respectively connected to lines $1_1$ to $1_n$, a microprocessor 12 for performing control, maintenance, and management of a bus, and a main memory 13, an output port 14, and an input port 15 which are connected to system bus 16 of the microprocessor 12. The main memory 13 has a RAM (random access memory) and a ROM (read-only memory).

The packet switching unit 20 as the main feature of the present invention comprises a packet separator 21, which has an input terminal 21A connected to the output port 14 of the packet transmission controller 10, and separates a data packet input from the output port 14 into a header part and a data part; a packet data buffer 22, the input terminal of which is connected to an output terminal 21B of the packet separator 21 for outputting the separated data part, and which temporarily stores input data; a packet combiner 23, one input terminal 23A of which is connected to the output terminal of the packet data buffer 22, and which combines an input from its other input terminal 23B (to be described later) and an input from the input terminal 23A; and a packet header processor 30, the input terminal of which is connected to an output terminal 21C of the packet separator 21 for outputting the separated header part, and which modifies the input at its input terminal to supply it to the input terminal 23B of the packet combiner 23.

The operation of the packet switching system shown in FIG. 1 will now be described. The lines $1_1$ to $1_n$ and the packet transmission controller 10 communicate logical multiplexed data packets with each other through the corresponding line terminal controls $11_1$ to $11_n$ upon instruction from the microprocessor 12. For example, a data packet received by the line terminal control $11_1$ is transferred to the packet separator 21 through the system bus 16 and the output port 14 under the control of the microprocessor 12. The packet separator 21 identifies a call by the line number and the logic channel of the received packet, and discriminates the type of the packet. If the received packet is a data packet, the separator 21 separates the header part necessary for control from the data packet, and adds an input line identifier to the header part to form an input token. The separator 21 then transfers the input token to the packet header processor 30 and transfers the data part to the packet data buffer 22. At this time, the packet data buffer 22 stores the data part received in accordance with an instruction from the packet separator 21.

The token input to the packet header processor 30 is subjected to predetermined processing to be updated, and is then output to the packet combiner 23. The packet combiner 23 combines the updated header part supplied from the packet header processor 30 and the data part read out from the packet data buffer 22 to form the updated packet and supplies it to the input port 15. The packet supplied to the input port 15 is sent onto the line $1_n$ via the system bus 16 and, e.g., the line terminal control $11_n$ upon instruction from the microprocessor 12.

Figure 2:
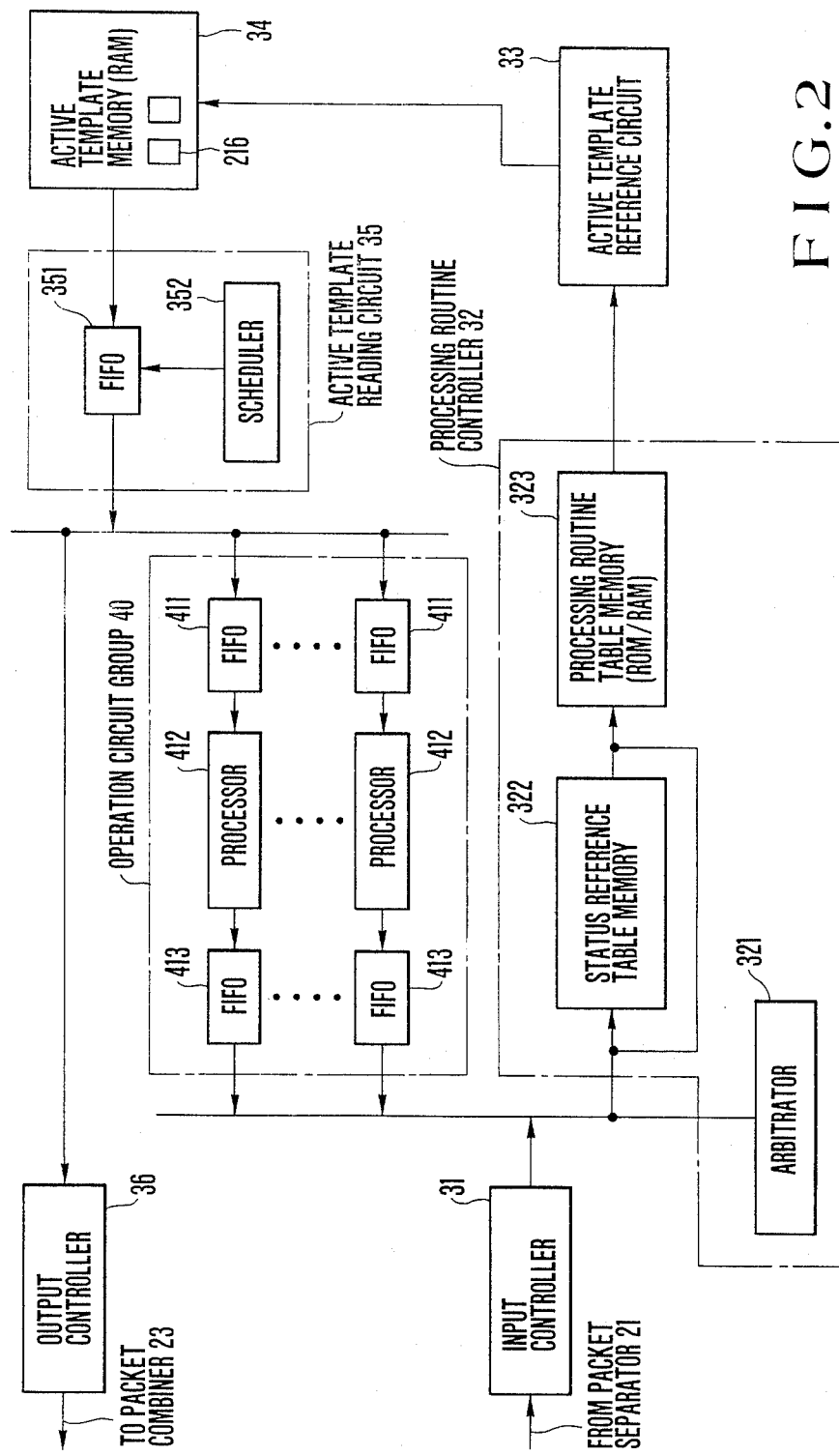
FIG. 2 is a block diagram of a packet header processor shown in FIG. 1.

FIG. 2 is a block diagram of an embodiment of the packet header processor 30 shown in FIG. 1. Referring to FIG. 2, the packet header processor 30 comprises an input controller 31 for receiving the output from the packet separator 21; a processing routine controller 32 for receiving the output from the controller 31; an active template reference circuit 33 for receiving the output from the controller 32; an active template memory 34 for receiving the output from the circuit 33; an active template reading circuit 35 for reading out the content of the memory 34; an operation circuit group 40 for performing a predetermined operation upon reception of the output from the reading circuit 35 and supplying the operation result to the controller 32; and an output controller 36 for supplying an output token to the packet combiner 23 upon reception of the output from the reading circuit 35.

The processing routine controller 32 comprises an arbitrator 321, connected to the output terminal of the input controller 31, for controlling an input token; a status reference table memory 322, connected to the output terminal of the input controller 31, for storing the status of the input token for every line; and a processing routine table memory 323 for receiving the outputs from the memory 322 and the controller 31 to determine the flow of following processing based on the input data.

The active template reference circuit 33 comprises a memory storing reference addresses of active templates 216 which does not satisfy a fire condition or of new templates in the active template memory 34. The active template memory 34 comprises a memory storing active templates.

The active template reading circuit 35 comprises a FIFO (first-in first-out) register 351 and a scheduler 352 for controlling the FIFO register 351.

The operation circuit group 40 comprises a plurality of operation circuits connected in parallel with the output terminal of the reading circuit 35. Each operation circuit consists of a FIFO register 411 commonly connected to the output terminal of the FIFO register 351 of the reading circuit 35, a processor 412 comprising a general-purpose processor, and a FIFO register 413, the input terminal of which is connected to the output terminal of the processor 412, and the output terminal of which is connected to the input terminal of the table memory 322 of the controller 32.

The operation of the packet header processor 30 shown in FIG. 2 will be described with reference to the sequence diagram in FIG. 3 and the flowchart shown in FIG. 4.

Figure 3:
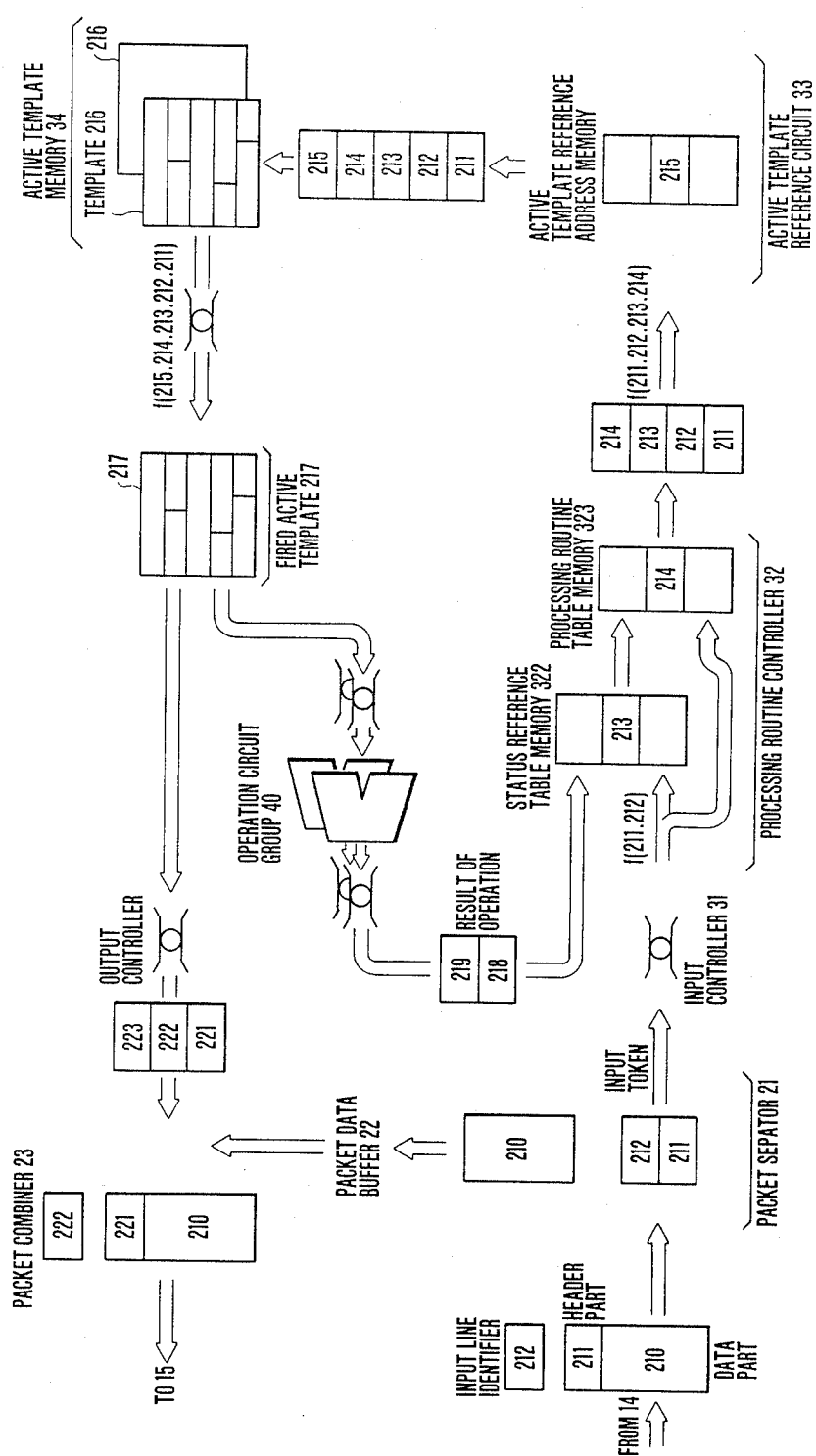
FIG. 3 is a sequence diagram for explaining the operation of the packet header processor shown in FIG. 2.

Referring to FIG. 3, in the packet separator 21, a data part 210 and a header part 211 are separated, and an input token consisting of the header part 211 and an input line identifier 212 is supplied to the input controller 31, as described previously. A status number of a corresponding logic line is read out from the status reference table memory 322 with reference to control data f(211,212) included in the input token from the controller 31. The processing routine table memory 323 is referred to by a new reference address 213 generated by the status number and the control data f(211,212) of the input token directly supplied thereto, and a reference address 214 of the reference circuit 33 is then added to the input token. Active template reference data 215 is added to the token (211,212,213,214) referring to the reference circuit 33, and the token is then transferred to the active template memory 34. The token is written in an active template 216 together with the data of its own. An active template 217 which satisfies a "fire" condition is read out by the reading circuit 35, and is transferred to the operation circuit group 40 or the output controller 36 in accordance with an instruction written in the active template 217.

Figure 4:
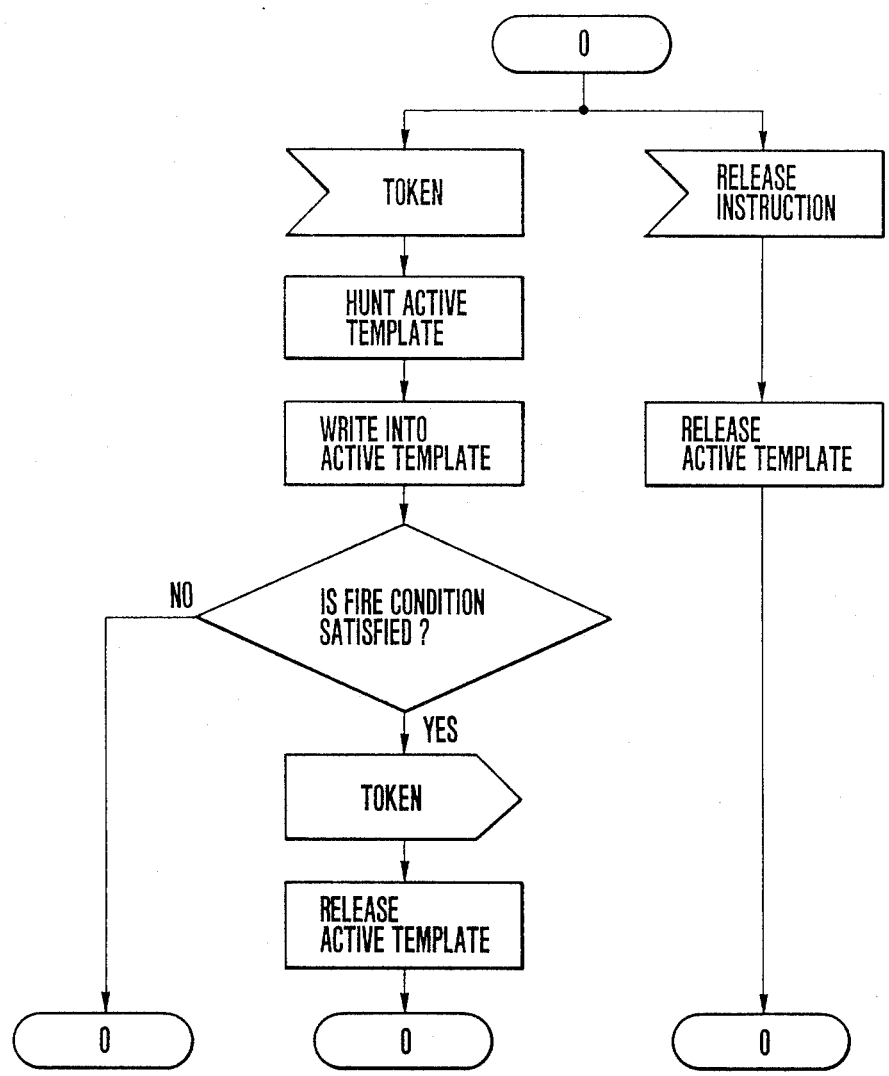
FIG. 4 is a flowchart showing the operation of an active memory shown in FIG. 2.

FIG. 4 is a flowchart showing a embodiment of processing of the active template memory 34. Referring to FIG. 4, the left branch of flow shows processing when input data is a temporary token, and the right branch of flow shows the processing when input data is a release instruction token necessary for interrupting the processing.

The active template 217 input to one operation circuit of the operation circuit group 40 selected by the active template reading circuit 35 is subjected to operation processing, and an operation result 218 is supplied to the processing routine controller 32 as an input token having a new reference address 219. The above operation is repeated a required number of times.

If the active template of the memory 34 stores all data necessary for final output, the template is fired and is supplied to the output controller 36. The output controller 36 supplies the output token consisting of an updated packet header part 221, an output line identifier 222, and output control data 223 to the packet combiner 23. The combiner 23 combines the updated header part 221 and the data part 210 supplied from the packet data buffer 22 to form a new packet, and supplies it to the input port 15.

According to the present invention as described above, a data packet constituting a major traffic of packet communication in packet switching processing is separated into a data part and a header part, and only the header part is processed at high speed by a packet header processor having a pipeline structure on the basis of a data flow principle. For this reason, large-capacity, high-speed processing is allowed without being influenced by the length of the data part of the packet.

Since only the data part is subjected to buffering, the capacity of the buffer memory can be freely selected regardless of the processor, and a switching means for the packet length can be achieved by a simple circuit arrangement.

Since the packet header processor is a data flow type processor, the parallel flow property of the packet switching processing, such as development of a facility field, checking of facilities, and the like can be easily realized, thereby greatly improving processing speed and throughput.

What is claimed is:

1. A packet switching system including packet transmission control means, connected to a line group, for performing transmission control of a data packet, and packet switching means for receiving the data packet from said packet transmission control means to perform switching, wherein said packet switching means comprises:
packet separating means for separating the data packet into a header part and a data part;
packet header processing means for updating the separated header part;
packet data buffer means for storing the separated data part; and packet combining means for combining the output from said packet data buffer means and the output from said packet header processing means and supplying a combined packet to said packet transmission control means.

2. A system according to claim 1 wherein said packet separating means supplies the separated header part to said packet header processing means after adding to the separated header part an input line identifier which distinguishes a line terminal control number.

3. A system according to claim 2 wherein said packet header processing means comprises an input controller for receiving the output from said packet separating means to geneate a first reference address including said header part and said input line identifier; a processing routine controller which is referred to by the first reference address to generate a second reference address; active template reference means which is referred to by the second reference address to generate active template reference data; an active template memory which incorporates a plurality of active templates and receives the active template reference data to write in the active template; active template reading means for reading out an active template satisfying a fire condition from said active template memory; an operation circuit group which receives the active template read out from said active template memory to perform operation processing and generates a third reference address to supply it to an input terminal of said processing routine controller; and an output controller for receiving the active template storing all the necessary data from said active template memory to supply the undated header part to said packet combining means.

4. A system according to claim 3 wherein said processing routine controller comprises a status reference table memory for generating a status number in accordance with said first reference address which is the output from said input controller; a processing routine table memory for generating the second reference address upon reception of the outputs from said input controller and said status reference table memory; and an arbitrator for controlling the input to said status reference table memory.

5. A system according to claim 3, wherein said operation circuit group consists of a plurality of operation circuits including processors each of which is parallel-connected between the output of said template reading means and the input of said processing routine controller, and said operation circuits are selected by said active template reading means.

6. A system according to claim 3, wherein said active template reference means includes a memory storing addresses of said active template memory.

* * * * *